Patented Oct. 9, 1923.

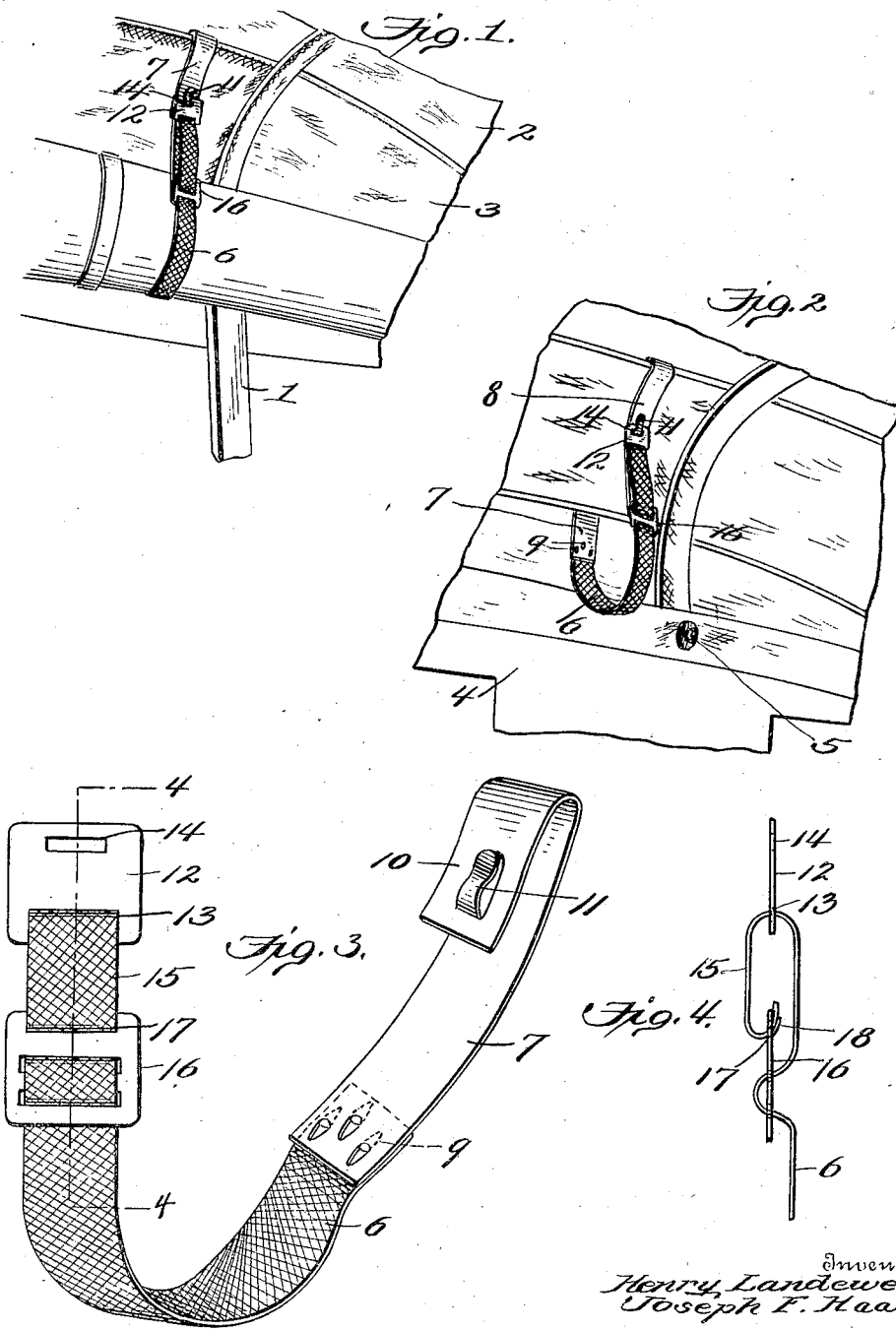

1,470,454

UNITED STATES PATENT OFFICE.

HENRY LANDEWEER AND JOSEPH F. HAAS, OF CHICAGO, ILLINOIS.

CURTAIN HOLDER FOR AUTOMOBILE CURTAINS.

Application filed June 28, 1922. Serial No. 571,442.

*To all whom it may concern:*

Be it known that we, HENRY LANDEWEER and JOSEPH F. HAAS, citizens of the United States, residing at Chicago, in the county of Cook and State of Illinois, have invented new and useful Improvements in Curtain Holders for Automobile Curtains, of which the following is a specification.

This invention relates to curtain holders for automobile curtains and proposes the construction of a device of the character indicated which may readily be applied to an automobile top without the use of tools and without marring, altering or in any way requiring the performance of any mechanical operation upon the automobile structure.

One of the objects of the invention is the provision of means detachably carried by the automobile top for supporting the rolled side curtains without necessitating the unfastening of the top edge of the curtains from the automobile top.

Another object of the invention is the construction of a curtain supporting strap attached to a rigid portion bent to conform to the shape of the longitudinal padding strip which forms a part of the automobile top, said rigid portion being hooked at its upper end to embrace the upper edge of said padding strip, and being positioned by slipping it between the padding strip and top cover.

Still another object of the invention is the provision of a curtain holder which is partly flexible and in part rigid, the rigid portion when operatively positioned lying between the top cover of the automobile and the padding strip and being self-sustained by hooking over the latter, there being complementary latching means on both the rigid and flexible parts for holding the flexible part in the form of a curtain supporting loop.

Still another object of the invention is the construction of a curtain holder adapted to be supported by the padding strip of the automobile top, said curtain holder comprising a rigid portion which is bendable to conform to the shape of any padding strip, and slidably adjustable along said padding strip when operatively positioned relative thereto.

A further object of the invention is to provide the flexible strap with an adjusting buckle having novel means for securing thereto the end of the flexible strap.

With the above and other objects in view, our invention consists in the improved curtain holders for automobile curtains illustrated in the accompanying drawings, described in the following specification, and particularly claimed, and in such variations and modifications thereof as will be obvious to those skilled in the art to which our invention relates.

In the drawings accompanying and forming a part of this specification, and wherein the preferred embodiment of our invention is illustrated:—

Figure 1 is a view in perspective showing a portion of the interior of the top of an automobile with our improved curtain holder in place showing a rolled curtain supported thereby.

Figure 2 is a similar view showing the curtain holder idle.

Figure 3 is a perspective view on an enlarged scale of the curtain holder.

Figure 4 is a cross section taken along the line 4—4 of Figure 3.

Referring now in detail to the several figures, the numeral 1 represents a portion of one of the bows of an automobile top which supports the top cover 2. A longitudinal padding strip 3 lies between the rounded angle of the bow and the cover 2 as is usual in the construction of the open type of automobile tops. The side curtain 4 which is shown in Figure 2 is of ordinary construction and is secured around the edge of the automobile top by means of the turn-button fasteners 5 which are supported by the bows. In most automobile curtain installations the curtains are bodily demounted from the fasteners 5 when not in use and rolled or folded and placed beneath a seat of the automobile or within a flap pocket carried in the automobile top. By the present invention it is not necessary to remove the curtains from the fasteners 5 but merely to roll them up from the bottom while in place and retain them in the looped strap 6.

The curtain holder of which the flexible strap 6 is a part is designed to be applied readily to those types of automobiles which have no means of holding the curtains in rolled position and without changing, altering or disfiguring in any manner the existing structure of the automobile top. To this end the curtain holder comprises the rigid portion 7 which is bent with a curvature conforming to the curvature of the convex side of the bow 1, said rigid portion being passed between the padding strip 3 and the top cover 2 and bent into a hook 8 which embraces the upper edge of the padding strip and by means of which the curtain holder is maintained in place. Several, or any number of these curtain holders may be used and they may be shifted longitudinally of the padding strip so as to be in position most advantageously to hold the rolled curtain.

This is a meritorious feature not found in existing types of curtain holders for it is ruinous to the curtain to have the supporting strap engage it across the celluloid lights, and the slidable adjustment of the present curtain holder permits the latter to be moved to a position in which contact with the lights is avoided.

The flexible strap 6 is secured to the rigid portion 7 of the holder by means of struck-out tongues 9 which penetrate through the flexible strap and are riveted tightly thereagainst. The hooked end 10 of the rigid portion 7 is provided with a snap hook 11 which engages a latch plate 12 having a pair of slots 13 and 14 through the former of which passes the loop 15 of the flexible strap, the slot 14 being engageable with the snap hook for holding the flexible strap 6 in looped arrangement as shown in Figure 2.

An adjusting buckle 16 is provided for the flexible strap, having a slot 17 formed by slitting the buckle and stamping out a tongue 18, being then pressed back against said flexible strap into clamping relation thereto.

The operation of our improved curtain holder is obvious from the illustrations of the drawing and from the foregoing description. It is merely necessary to roll the curtain, place it within the loop formed by the flexible strap 6 and snap the latching elements 11 and 12 together. To permit the curtain to be unrolled requires only the unfastening of said latching elements. Two or more of the curtain holders may be placed in close proximity to form a package carrier, if desired, or they may be entirely removed from the automobile top at any time, should such a procedure be deemed desirable leaving said top in its original condition.

While the portion 7 is described as rigid it is at the same time bendable so that when first installed it may be bent to conform closely to the contour of the outside of the padding strip. The slidability of the curtain holders relative to the padding strip enables any number of holders to be used at any distance apart thus accommodating the curtain holders to curtains of various widths and permitting the avoidance of contact of said curtain holders with the celluloid lights of the curtains.

Obviously, changes in the details of construction may be made, without departing from the spirit of the invention and we do not wish to limit ourselves to any particular form or arrangement of parts.

Having described our invention what we claim as new and desire to secure by Letters Patent, is:—

1. In combination with an automobile top including a longitudinally arranged padding strip, a curtain holder having a rigid portion conforming in shape to the exterior side of said padding strip and having a hooked end extending over the upper edge of said padding strip and being slidably supported by said padding strip, and flexible strap permanently secured to said rigid portion at one end and being detachably secured thereto at its other end.

2. A curtain holder adapted to be used in connection with the padding strip of an automobile top comprising a rigid portion having a shape conforming to that of the outside of said padding strip and having a hooked end adapted to hook over the upper edge of said padding strip, a flexible strip permanently secured to the lower end of said rigid member and latchably securable at its other end to said rigid member.

3. A curtain holder comprising a rigid portion bendable to conform to the shape of the exterior surface of a padding strip and having a hooked end adapted to embrace the upper edge of said padding strip, a flexible strap permanently secured to the lower end of said rigid portion and latchably securable at its opposite end to the hooked end of said rigid portion.

4. A curtain holder for automobile curtains comprising a rigid portion bendable to conform to the shape of the exterior surface of a padding strip and hooked at its upper end to embrace the upper edge of said padding strip, a flexible strap permanently secured to the lower end of said rigid member and latchably secured to the hooked end thereof, and an adjusting buckle for said flexible strip having a slot therein formed by upsetting a slitted portion of said buckle, the end of said flexible strap being inserted in said slot and said upsetting portion being permanently forced thereagainst.

In testimony whereof we have hereunto set our hands in presence of two subscribing witnesses.

HENRY LANDEWEER.
JOSEPH F. HAAS.

Witnesses:
FRANK WINTER,
JOHN M. COONEY.